July 16, 1963 R. W. BROWN 3,097,856
CHUCKING MECHANISM
Filed May 12, 1961 2 Sheets-Sheet 1
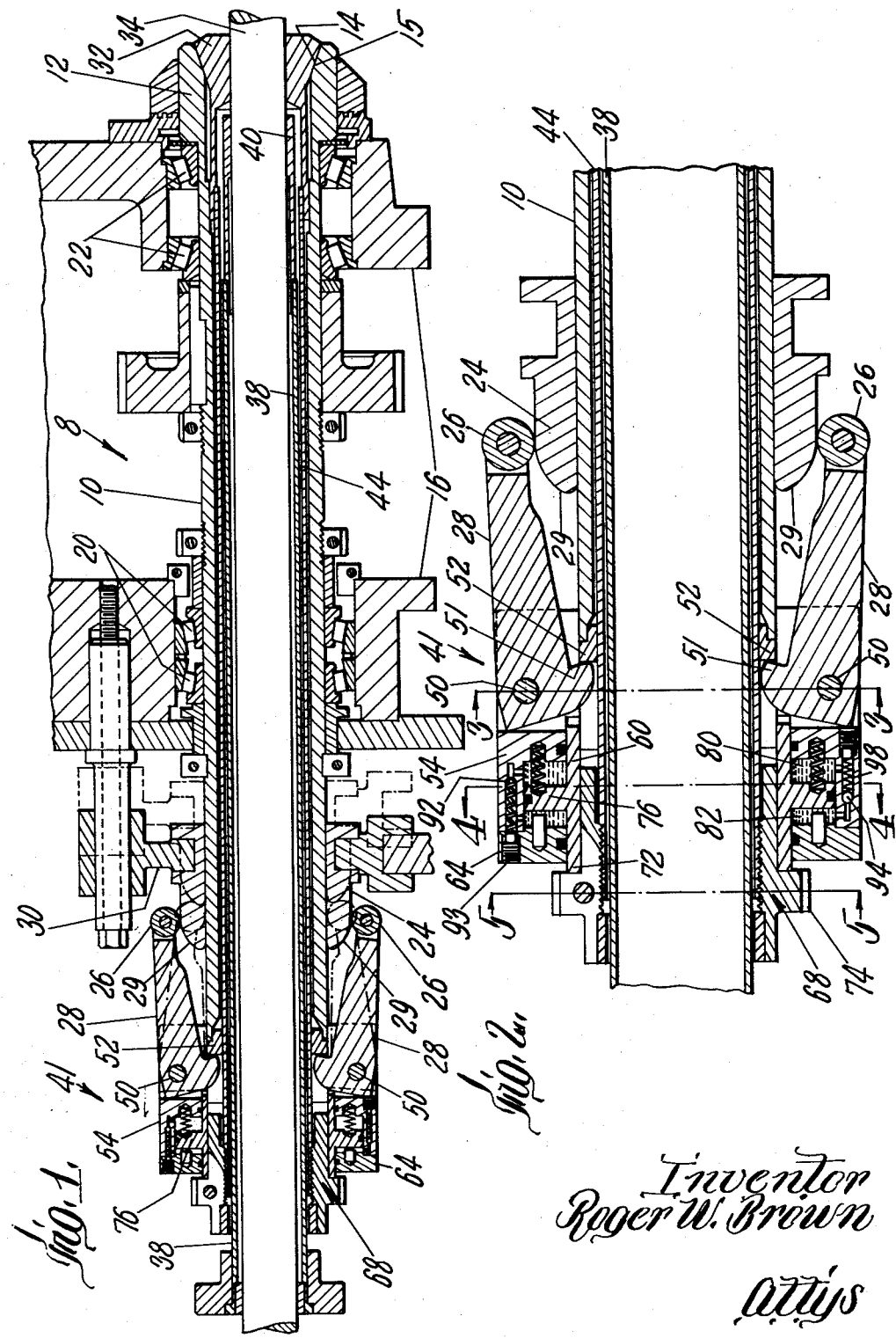
Inventor
Roger W. Brown
attys

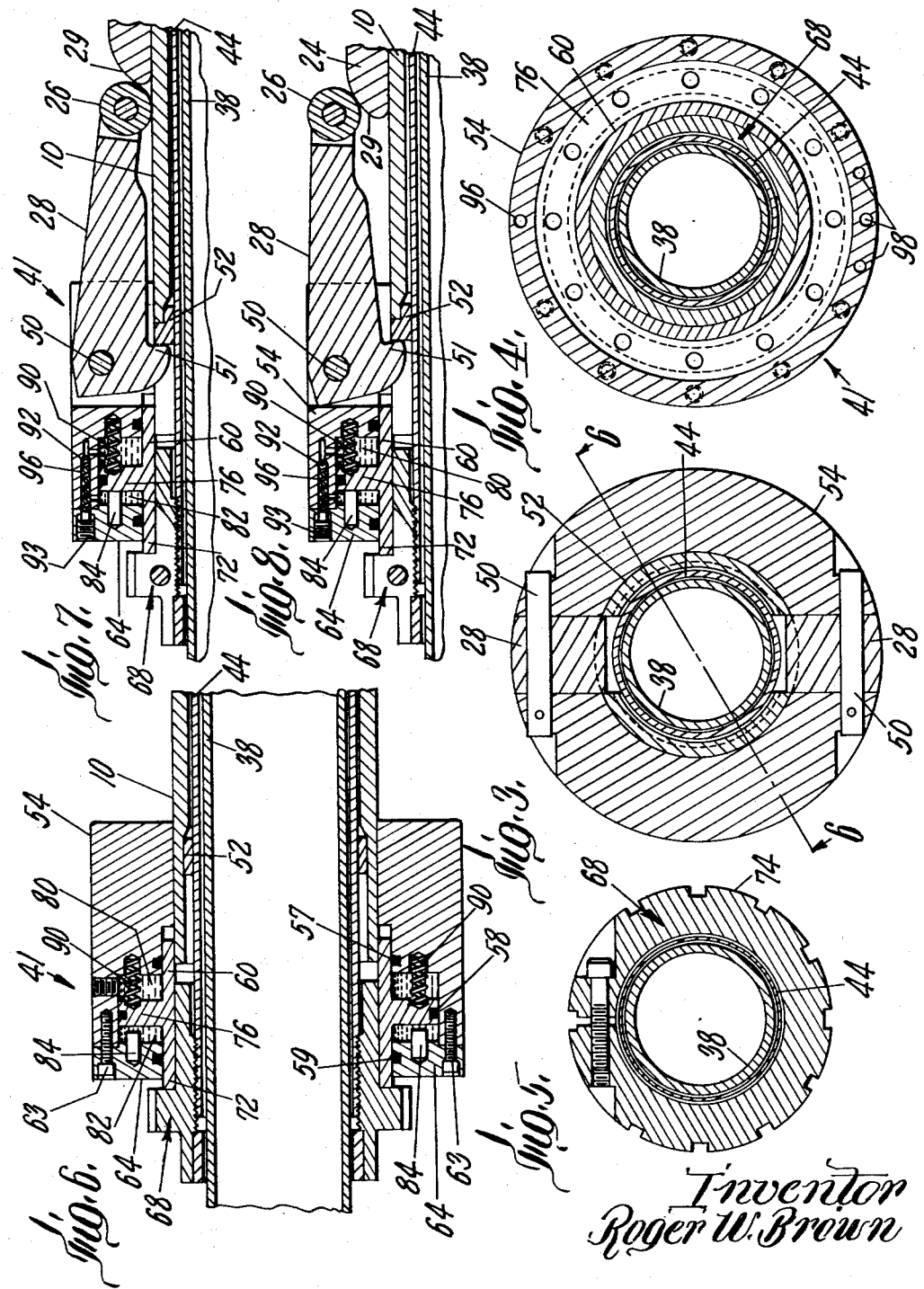

3,097,856
CHUCKING MECHANISM
Roger W. Brown, Windsor, Vt., assignor to Cone Automatic Machine Company, Inc., Windsor, Vt., a corporation of Vermont
Filed May 12, 1961, Ser. No. 109,774
7 Claims. (Cl. 279—4)

This invention generally relates to chucking mechanisms and more particularly to an improved chucking mechanism adapted to operate a collet.

It is a principal object of this invention to provide an improved collet chucking mechanism which is capable of maintaining a constant collet engaging force on its supported stock even though the stock varies in size from the standard size for which the collet is specifically designed and thereby eliminates the possibility of having an excessive or an inadequate collet engagement.

Another object of this invention is to provide an improved collet chucking mechanism that smoothly and positively operates the lathe collet between its stock-locking and releasing positions so as to eliminate sudden or erratic collet engagement and disengagement and the shock on the collet and chucking mechanism produced thereby.

It is a further object of this invention to provide an improved collet chucking mechanism which has a simple arrangement of parts that can be economically manufactured and easily assembled and wherein adjustments in the collet engaging force on the stock can be readily made and which will thereafter be continuously maintained.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a fragmentary longitudinal cross-sectional view of a lathe spindle assembly mounted on a spindle carrier, and includes a preferred embodiment of the collet chucking mechanism of this invention;

FIG. 2 is an enlarged cross-sectional view of a portion of the spindle assembly of FIG. 1 showing the chucking mechanism in its collet locking position;

FIG. 3 is a cross-sectional view taken substantially along the line 3—3 of FIG. 2;

FIG. 4 is a cross-sectional view taken substantially along the line 4—4 of FIG. 2;

FIG. 5 is a cross-sectional view taken substantially along the line 5—5 of FIG. 2;

FIG. 6 is a fragmentary cross-sectional view taken substantially along the line 6—6 of FIG. 3;

FIG. 7 is a cross-sectional view of a portion of the spindle assembly of FIG. 2 showing the chucking mechanism in its collet releasing position; and FIG. 8 is a fragmentary cross-sectional view similar to FIG. 7 showing the chucking mechanism in an intermediate position.

Referring to the drawings more in detail, a work spindle assembly, generally designated by the numeral 8, has a work spindle 10 that is shown to be rotatably mounted by the tapered roller bearing assemblies 20 and 22 within a multiple spindle lathe carrier 16. The spindle 10 has an enlarged head or collet support 12 with an inwardly tapered conical bore 14 that is adapted to receive and engage a collet 32 having a mating external conical surface 15. A collet operating tube or sleeve 44 is fixed to the collet and is capable of rectilinear movement along the axis of the spindle 10 between a stock locking position (FIG. 1) where the collet is in engagement with the head 12 for retaining the stock 34, and a stock releasing position (not shown) where the stock 34 can be fed forwardly through the collet as by the feed fingers 40 fixed to the feed or pusher tube 38.

In accordance with this invention, a chucking mechanism is provided for retracting the collet and locking the stock and includes a compensator generally designated by the numeral 41 which is slidably supported upon and adapted to axially engage a collar 68 that has an adjustable threaded engagement with the collet operating tube 44. This compensator 41 is operated as by a cam sleeve 24 that is actuated by a lever 30 between a collet locking position shown by bold lines in FIG. 1 and a collet releasing position shown in phantom in FIG. 1.

The compensator has an annular housing 54 which pivotally supports a plurality of fingers 28 by pins 50. Each finger 28 has a follower or roller 26 rotatably mounted upon the end thereof which is adapted to engage a camming surface 29 on the cam sleeve 24 for translating the sliding motion of the cam sleeve 24 into pivotal motion of the fingers 28. Because of the engagement by the finger heels 51 with a collar 52 that abuts the spindle 10, the pivotal movement of the fingers 28 is translated into sliding movement of the housing 54.

The annular housing 54 has an annular cap 64 affixed thereto as by a plurality of angularly disposed screws 63 (FIG. 6), to define an annular fluid chamber in which an annular piston 76 is adapted to reciprocate. The piston has integral therewith a sleeve 60 that is slideably mounted on the collar 68, and the piston and sleeve are located to divide the chamber into a pair of fluid chamber portions 80 and 82 which are fluidly sealed within the housing 54 as by the sealing rings 57, 58 and 59 to prevent fluid leakage or fluid passage therebetween. Hydraulic fluid is disposed within the chamber portions 80 and 82 to act as a fluid medium through which the movement of the housing 54 is transferred to the piston 76, which in turn, transfers its movement to the collet 32 through the abutting engagement by the end 72 of the piston sleeve 60 with the annular portion 74 of the collet operating tube collar 68.

When the compensator is moved to the nonlocking position, shown in FIG. 7, a plurality of springs 90 angularly disposed within the chamber portion 80 move the piston 76 rapidly to the left, as viewed in the drawings, against stop pins 84 on the cap 64 to quickly release the collet 32 whereupon any excess hydraulic fluid in the fluid chamber portion 82 is discharged into the chamber 80 via the passages 98 (FIGS. 2 and 4), a plurality of which are provided to ensure free flow of the fluid to the chamber 80, and therefore ensure a rapid resetting of the compensator for a subsequent collet locking operation. Each of these passages 98 has therein a one-way spring loaded ball check valve 94 that prevents fluid flow from the chamber 80 but which is adapted to relieve the fluid pressure in the chamber 82 prior to when it creates a force on the piston equal to the force created by the bias of the springs 90.

When the camming sleeve 24 is moved to the left for moving the collet to its locking position, the fingers 28 move outwardly and the housing 54 is likewise moved to the left. Initially, as shown in FIG. 8, the housing 54 and the piston move in unison because of the force on the piston 76 created by the springs 90 and by the fluid pressure in the chamber 80. However, when the collet locking force on the stock 34 reaches a magnitude where the fluid pressure in the chamber 80 is on the verge of unseating a second ball check valve 92 (FIG. 7) located in a passage 96 extending between the chamber portions, further movement of the housing 54 to the left will be accompanied by flow of hydraulic fluid to the chamber 82 (FIGS. 2 and 6), and the hydraulic force on the piston and the collet locking force on the stock 34 will remain substantially constant. Accordingly, through adjustment of the regulating pressure of the ball check valve 92 by the valve spring screw 93 (FIG. 2), an optimum locking force on the collet can be established.

The chucking mechanism of this invention, therefore, provides a simple and accurate means by which a constant optimum collet locking engagement is maintained on the collet supported stock notwithstanding possible size variations in the stock. Additionally, the chucking mechanism operates positively and smoothly and is easily adjusted for selecting the collet locking force which is thereafter continuously maintained.

As will be apparent to persons skilled in the art, various modifications and adaptations of the structure above described will become readily apparent without departure from the spirit and scope of the invention, the scope of which is defined in the appended claims.

I claim:

1. A chucking mechanism for use with a spindle assembly having a collet support and a collet adapted for relative rectilinear movement therein in stock-locking and releasing directions, comprising, a cylinder and a piston therein reciprocably mounted for movement along the axis of relative movement of the collet, means operably connecting the piston and the collet assembly and moving the collet relative to the spindle in the stock-locking direction upon movement of the piston in one direction, an hydraulic fluid disposed in the cylinder and adapted when under pressure to create a force on the piston in said one direction, means for moving the cylinder in said one direction for pressurizing the fluid, and a pressure relief valve connected to the cylinder limiting the maximum pressure of the hydraulic fluid.

2. A chucking mechanism in combination with a collet assembly having a collet support and a collet mounted for relative rectilinear movement therein in stock-locking and releasing directions, comprising, an annular cylinder and an annular piston therein mounted for movement along the axis of movement of the collet, said cylinder defining with the piston a pair of annular chambers on opposite axial sides thereof, means operably connecting the piston and the collet and moving the collet in the one direction relative to its support upon movement of the piston in one direction, an hydraulic fluid in said chambers, passage means fluidly connecting the chambers and having a one-way pressure relief valve therein for limiting the maximum pressure of the hydraulic fluid in one of the chambers, and means for moving the cylinder in said one direction.

3. The chucking mechanism defined in claim 2, further comprising, a second one-way pressure relief valve in said passage means limiting the maximum pressure of the hydraulic fluid in the other of said chambers.

4. A chucking mechanism in combination with a collet assembly having a collet support and a collet mounted for relative rectilinear movement therein in stock-locking and releasing directions, comprising, a cylinder and a piston therein mounted for movement along the axis of movement of the collet, said cylinder defining with the piston a pair of chambers on the opposite sides thereof, means operably connecting the piston and the collet and moving the collet in the stock-locking direction upon movement of the piston in said one direction, an hydraulic fluid disposed in the said chambers, passage means connecting the chambers for allowing hydraulic fluid flow therebetween, spring means biasing the piston in said one direction, a pressure relief valve fluidity connected to one of said chambers and limiting the maximum hydraulic pressure therein, and means for actuating the cylinder in said one direction.

5. A chucking mechanism in combination with a collet mounted for rectilinear movement in stock-locking and releasing directions and having a collet operating tube fixed thereto, comprising, an annular cylinder having an annular piston slideable therein, said cylinder and piston being mounted for movement along the axis of movement of the collet, said cylinder defining with the piston a pair of annular chambers on opposite sides thereof, means fixed to the collet operating tube being adapted to be actuated by the piston for moving the collet in the stock-locking direction upon movement of the piston in one direction, an hydraulic fluid disposed in said chambers, passage means fluidly connecting the chambers for allowing hydraulic fluid flow therebetween, means limiting the maximum pressure of the fluid in at least one of the chambers, and means for moving the cylinder in said one direction.

6. A chucking mechanism for use with a collet mounted for rectilinear movement in stock-locking and releasing directions, comprising; a cylinder having a piston slideable therein, said cylinder and piston being mounted for movement along the axis of movement of the collet, said cylinder defining with the piston a pair of chambers on opposite axial sides thereof, means operably connecting the piston and the collet and moving the collet in the stock-locking direction upon movement of the piston in one direction, spring means in a first of said chambers engaging the piston and cylinder and biasing the piston in said one direction, an hydraulic fluid in said chambers, passage means fluidly connecting the chambers for providing hydraulic fluid flow therebetween, fluid pressure relief means in said passage means limiting the maximum pressure in each of the chambers, the force on the piston created by the spring means being greater than the force created on the piston by the maximum pressure in the second of said chambers, and means for moving the cylinder in said one direction.

7. A chucking mechanism for use in a lathe having in coaxial relationship a rotating spindle, a collet with a collet operating tube fixed to the collet and adapted to move the collet in stock engaging and releasing directions, and a sleeve selectively moved along the collet axis for operating the chucking mechanism, comprising; an annular sleeve mounted coaxially with the collet operating tube for movement along the axis thereof, means fixed to the collet operating tube and engaged with said sleeve for moving the tube in the stock-locking direction upon movement of said sleeve in one direction, an annular piston fixed to the sleeve, an annular cylinder slideably mounted upon the sleeve and defining with the piston a pair of annular chambers on the opposite sides thereof, spring means in a first of said chambers engaging the cylinder and the piston and forcing the piston in said one direction, stop means limiting movement of the piston within the cylinder in said one direction, an hydraulic fluid disposed in said chambers, passage means fluidly connecting the chambers for allowing hydraulic fluid flow therebetween, pressure relief means in said passages limiting the maximum pressure of the hydraulic fluid in the chambers and means moving the cylinder in said one direction actuated by the sleeve.

References Cited in the file of this patent
UNITED STATES PATENTS

| | | |
|---|---|---|
| 2,793,040 | Wilson | May 21, 1957 |
| 2,886,007 | Manchester | May 12, 1959 |
| 2,938,500 | Damijonaitis | May 31, 1960 |